(12) United States Patent
Choi et al.

(10) Patent No.: US 8,493,361 B2
(45) Date of Patent: Jul. 23, 2013

(54) TOUCH TYPE DISPLAY DEVICE

(75) Inventors: Jong-Seong Choi, Paju (KR); Hyung-Uk Jang, Goyang (KR); Sang-Hyuck Bae, Paju (KR); Byung-Chun Yu, Paju (KR)

(73) Assignee: LG Display Co., Ltd., Seoul (KR)

( * ) Notice: Subject to any disclaimer, the term of this patent is extended or adjusted under 35 U.S.C. 154(b) by 612 days.

(21) Appl. No.: 12/628,079

(22) Filed: Nov. 30, 2009

(65) Prior Publication Data
US 2010/0156828 A1 Jun. 24, 2010

(30) Foreign Application Priority Data
Dec. 24, 2008 (KR) .................. 10-2008-0133980

(51) Int. Cl.
*G06F 3/042* (2006.01)
(52) U.S. Cl.
USPC .......................................... 345/175; 345/173
(58) Field of Classification Search
None
See application file for complete search history.

(56) References Cited

U.S. PATENT DOCUMENTS

| | | | | |
|---|---|---|---|---|
| 7,629,967 B2 * | 12/2009 | Newton | ................ | 345/173 |
| 7,824,032 B2 * | 11/2010 | Isogai et al. | ................ | 351/202 |
| 8,139,046 B2 * | 3/2012 | Kweon et al. | ................ | 345/175 |
| 2005/0243172 A1 * | 11/2005 | Takano et al. | ................ | 348/148 |
| 2007/0223792 A1 * | 9/2007 | Morimoto et al. | ................ | 382/126 |

FOREIGN PATENT DOCUMENTS

| | | |
|---|---|---|
| JP | 2008-191261 A | 8/2008 |
| KR | 10-0804815 B1 | 2/2008 |
| WO | WO 2006073196 A1 * | 7/2006 |

* cited by examiner

*Primary Examiner* — Lixi C Simpson
(74) *Attorney, Agent, or Firm* — Birch, Stewart, Kolasch & Birch, LLP

(57) ABSTRACT

A touch type display device includes: a flat panel display module; a plurality of infrared light emitting units disposed on a portion or on the entirety of the edge of the flat panel display module; an infrared camera disposed on at least two corners of the flat panel display module; and a band pass filter allowing light of a certain wavelength band in light emitted from the infrared light emitting units to pass therethrough so as to be supplied to the infrared camera.

6 Claims, 3 Drawing Sheets

TOUCH TYPE DISPLAY DEVICE

The present application claims priority to Korean Application No. 10-2008-0133980 filed in Korea on Dec. 24, 2008, the entire contents of which is hereby incorporated by reference in its entirety.

BACKGROUND OF THE INVENTION

1. Field of the Invention

The present invention relates to a touch type display device and, more particularly, to a touch type display device capable of maximizing a signal-to-noise ratio (SNR) in a solar light environment.

2. Description of the Related Art

Recently, as the electronic technology is being rapidly developed, user expectation with respect to display devices having various functions is growing, and in order to meet such user demand, research on a touch type display device available for image conversion by using a touch function applied thereto without an external input device such as a mouse and the like is actively ongoing.

There are various types of touch type display devices including a resistive film type touch display device, a capacitance touch type display device, an electromagnetic induction touch type display device, and the like, according to how coordinates of a touched point are recognized. Recently, a touch type display device for recognizing coordinates of a touched point by using infrared. The touch type display device using infrared can be easily applied to a large-scale display device and easily recognize a multi-touch, so its application coverage widens.

The touch type display device using infrared includes a flat panel display module, an infrared light emitting diode disposed at a portion of an edge of the flat panel display module, and an infrared camera disposed at two corners of the flat panel display module.

In the related art general touch type display device having such configuration, when a user touches a certain point of the screen of the flat panel display module with his finger (or an indication rod), infrared ray emitted from an infrared light emitting diode (LED) of the touched point is covered by the user's finger, so an infrared camera receives no infrared ray at the corresponding touched point. The infrared camera transfers the touch-related information to a controller, and the controller analyzes the touch-related information to determine coordinates of the touched point.

The related art general touch type display device has a problem in that unnecessary external light is recognized by the infrared camera.

Namely, infrared light emitted from the infrared LED has a certain wavelength range, and a distribution of the external light (i.e., noise) is different from that of the infrared light emitted from the LED, resulting in an increase of the SNR of the light,

SUMMARY OF THE INVENTION

Therefore, in order to address the above matters, the various features described herein have been conceived. One aspect of the exemplary embodiments is to provide a touch type display device capable of maximizing a signal-to-noise ration (SNR) in a solar light environment.

This specification provides a touch type display device including: a flat panel display module; a plurality of infrared light emitting units disposed on a portion or on the entirety of the edge of the flat panel display module; an infrared camera disposed on at least two corners of the flat panel display module; and a band pass filter allowing light of a certain wavelength band in light emitted from the infrared light emitting units to pass therethrough so as to be supplied to the infrared camera.

The wavelength band of the light that passes through the band pass filter is the same as a wavelength taking up a distribution of more than 80% based on a wavelength corresponding to the center of the distribution in the infrared light emitted from the infrared light emitting units and having a certain wavelength distribution.

The foregoing and other objects, features, aspects and advantages of the present invention will become more apparent from the following detailed description of the present invention when taken in conjunction with the accompanying drawings.

DETAILED DESCRIPTION OF THE INVENTION

A touch type display device according to a first embodiment of the present invention will now be described with reference to the accompanying drawings.

Figure 1:
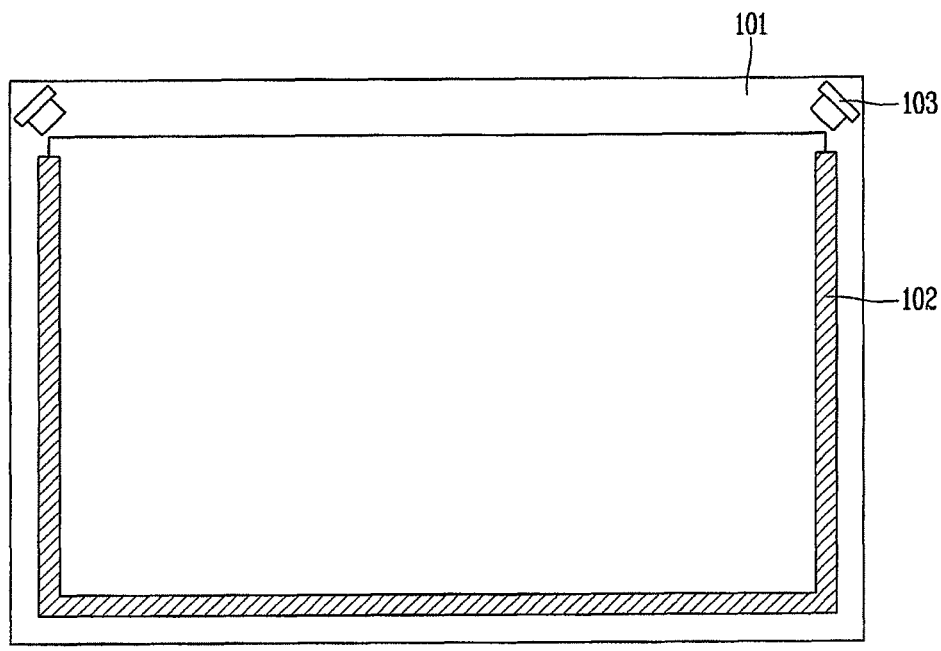
FIG. 1 illustrates a touch type display device according to an embodiment of the present invention.
Figure 2:
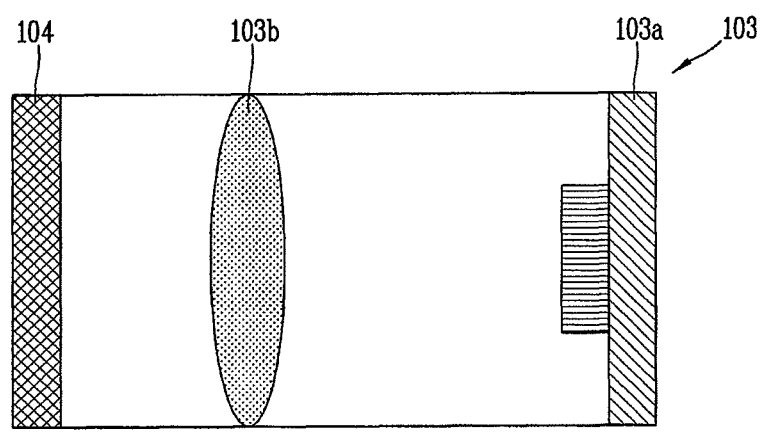
FIG. 2 is a sectional view of an infrared camera and a band pass filter of FIG. 1.

As shown in FIGS. 1 and 2, a touch type display device according to a first embodiment of the present invention includes: a flat panel display module 101; an infrared light emitting unit array 102 including plurality of infrared light emitting units disposed on a portion or on the entirety of the edge of the flat panel display module 101; an infrared camera 103 disposed on at least two corners of the flat panel display module 101; and a band pass filter 104 allowing light of a certain wavelength band in light emitted from the infrared light emitting units to pass therethrough so as to be supplied to the infrared camera 103.

The wavelength band of the light passing through the band pass filter 104 is the same as a wavelength band accounting for a distribution of more than 80% based on a wavelength corresponding to the center of the distribution of an infrared light emitted from the infrared light emitting unit and having a certain wavelength distribution.

The width of the wavelength band passing through the band pass filter 104 ranges from 20 nm to 30 nm. In particular, the infrared light emitting unit is an infrared light emitting diode which has a wavelength corresponding to the center of the wavelength distribution of emitted infrared light is 870 nm, and the wavelength allowed to pass through the band pass filter 104 ranges from 860 nm to 880 nm.

Figure 3:
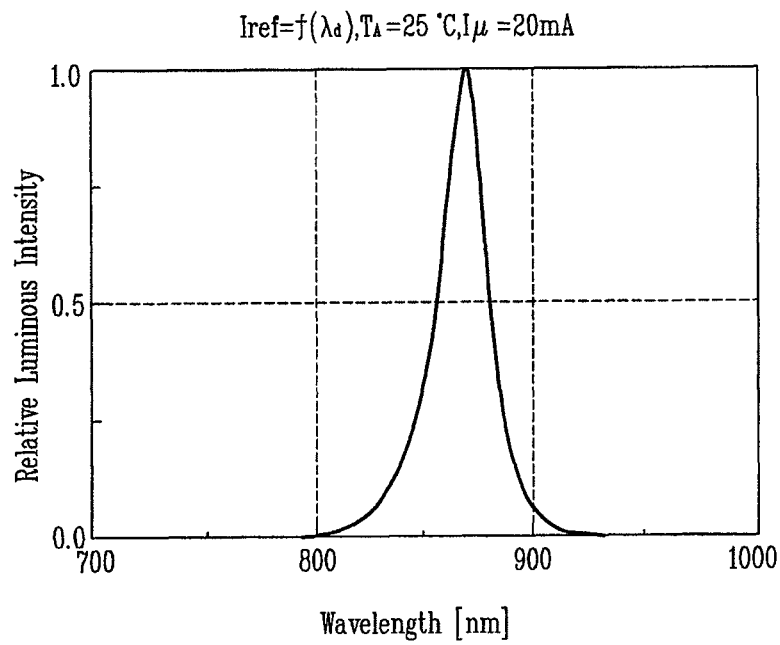
FIG. 3 is a graph of a wavelength distribution of an infrared light emitting diode in which a wavelength corresponding to the center of the wavelength distribution is 870 nm.

Each element of the touch type display device according to the first embodiment of the present invention will now be described in detail with reference to FIGS. 1, 2 and 3.

For reference, FIG. 1 illustrates a touch type display device according to an embodiment of the present invention, FIG. 2 is a sectional view of the infrared camera 103 and the band pass filter 104 of FIG. 1. FIG. 3 is a graph of a wavelength distribution of the infrared light emitting diode in which a wavelength corresponding to the center of the wavelength distribution is 870 nm (referred to as '870 nm infrared light emitting diode', hereinafter).

With reference to FIG. 2, the infrared camera 103 includes a sensor 103a for sensing light passing through the band pass filter after being emitted from the infrared light emitting unit, and a lens 103b having a viewing angle of at least 90°. The band pass filter 104 is disposed on a front face or a rear face of the lens 103b.

With reference to FIG. 2, among various types of infrared light emitting diodes put in the market, the 870 nm infrared light emitting diode is employed as the infrared light emitting unit of the touch type display device according to the first embodiment of the present invention. With reference to FIG. 3, as for infrared light emitted from the 870 nm infrared light emitting diode and having a certain wavelength distribution, the light accounting for a distribution of more than 80% based on the wavelength 870 nm corresponding to the center of the distribution is within a wavelength band width range of 20 nm to 30 nm.

Thus, the touch type display device according to the first embodiment of the present invention employs the 870 nm infrared light emitting diode as the infrared light emitting unit and the band pass filter 104 having a pass wavelength band of 860 nm to 880 nm.

A simulation result using the 870 nm infrared light emitting diode as the infrared light emitting unit and the band pass filter 104 having a pass wavelength bane of 860 nm to 880 nm shows that noise (including solar light) was reduced by 3.6 times and light passing through the band pass filter 104 was reduced by 20%, compared with the related art touch type display device. Accordingly, a signal-to-noise ratio has increased 2.88 dB compared with the related art touch type display device.

Thus, in the touch type display device according to the first embodiment of the present invention, after light is emitted from the infrared light emitting unit, namely, from the infrared light emitting diode, when the light passes through the band pass filter 104, it is reduced by a small amount but noise is significantly reduced, resulting in a considerable increase in the signal-to-noise ratio. Thus, although the small amount of light is reduced after it passes through the band pass filter 104, the very high signal-to-noise ratio can be obtained advantageously.

Figure 4:
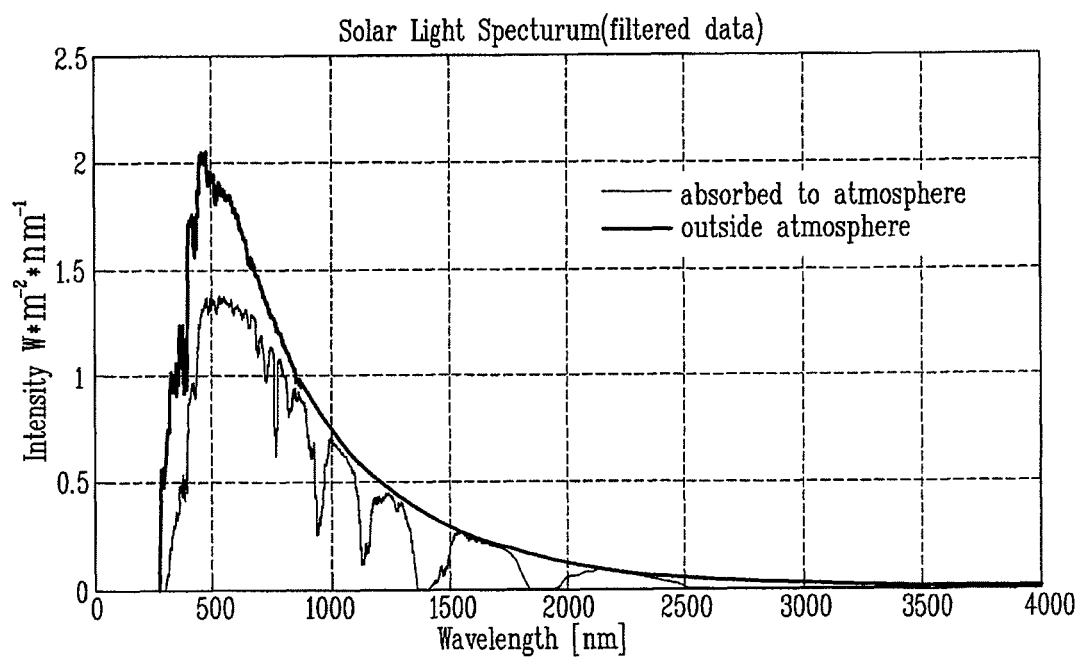
FIG. 4 is a graph of a distribution of wavelength of solar light.

In the touch type display device according to the first embodiment of the present invention, solar light among external light working as noise is the big problem. FIG. 4 shows the distribution of wavelength of the solar light. With reference to waveform (red color) with respect to solar light absorbed to the atmosphere among the two waveforms as shown in FIG. 4, it is noted that the light distribution of the solar light is reduced in a plurality of wavelength bands including the vicinity of a wavelength of 940 nm.

Thus, a second embodiment in which a signal-to-noise ratio is further increased by utilizing the distribution characteristics according to the wavelength of the solar light has been devised.

Second Embodiment

A touch type display device according to a second embodiment of the present invention will now be described.

The touch type display device according to the second embodiment of the present invention will now be described with reference to FIGS. 1 and 2 which have been referred to in describing the tough type display device according to the first embodiment for the sake of convenience.

As shown in FIGS. 1 and 2, the touch type display device according to the second embodiment of the present invention includes a flat panel display module 101; an infrared light emitting unit array 102 including a plurality of infrared light emitting units 102 disposed on a portion or on the entirety of the edge of the flat panel display module 101; an infrared camera 103 disposed on at least two corners of the flat panel display module 101; and a band pass filter 104 allowing light of a certain wavelength band in light emitted from the infrared light emitting units to pass therethrough so as to be supplied to the infrared camera 103.

The wavelength band of the light passing through the band pass filter 104 is the same as a wavelength band accounting for a distribution of more than 80% based on a wavelength corresponding to the center of the distribution of an infrared light emitted from the infrared light emitting unit and having a certain wavelength distribution.

The width of the wavelength band passing through the band pass filter 104 ranges from 20 nm to 30 nm. In particular, the infrared light emitting unit is an infrared light emitting diode which has a wavelength corresponding to the center of the wavelength distribution of emitted infrared light is 940 nm, and the wavelength allowed to pass through the band pass filter 104 ranges from 930 nm to 950 nm.

Each element of the touch type display device according to the second embodiment of the present invention will now be described in detail with reference to FIGS. 1, 2, 4 and 5.

Figure 5:
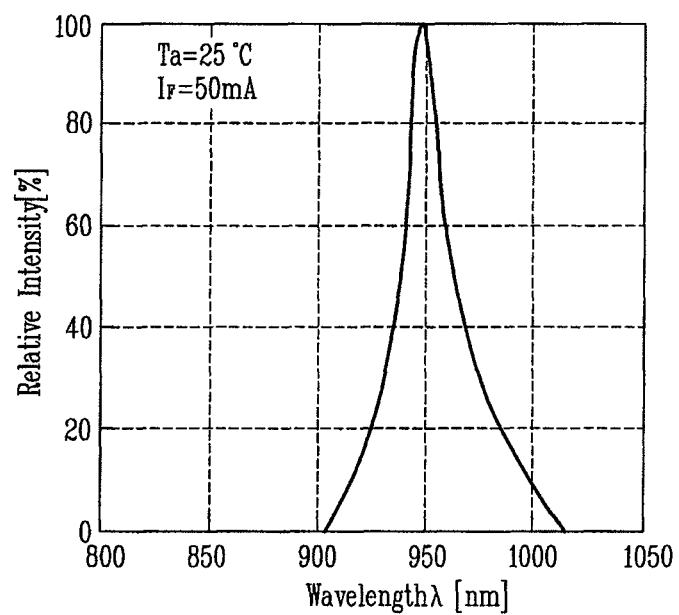
FIG. 5 is a graph of a wavelength distribution of an infrared light emitting diode in which a wavelength corresponding to the center of the wavelength distribution is 940 nm.

For reference, FIG. 5 is a graph of a wavelength distribution of an infrared light emitting diode in which a wavelength corresponding to the center of the wavelength distribution is 940 nm (referred to as '940 nm infrared light emitting diode', hereinafter).

With reference to FIG. 2, the infrared camera 103 includes a sensor 103a for sensing light passing through the band pass filter 104 after being emitted from the infrared light emitting unit, and a lens 103b having a viewing angle of at least 90°. The band pass filter 104 is disposed on a front face or a rear face of the lens 103b.

In FIG. 4, with reference to the waveform (red color) with respect to solar light absorbed to the atmosphere, it is noted that the light distribution of the solar light is reduced in the vicinity of the wavelength of 940 nm. Thus, the touch type display device according to the second embodiment of the present invention employs the 940 nm infrared light emitting diode as the infrared light emitting unit and the band pass filter 104 having a pass wavelength band of 930 nm to 950 nm.

A simulation result using the 940 nm infrared light emitting diode as the infrared light emitting unit and the band pass filter 104 having a pass wavelength bane of 930 nm to 950 nm shows that noise (including solar light) was reduced by 9 times and light passing through the band pass filter 104 was reduced by 20%, compared with the related art touch type display device. Accordingly, a signal-to-noise ratio has increased 7.2 dB compared with the related art touch type display device.

Thus, in the touch type display device according to the second embodiment of the present invention, after light is emitted from the infrared light emitting diode, when the light passes through the band pass filter 104, it is reduced by a small amount but noise is significantly reduced, resulting in a considerable increase in the signal-to-noise ratio. Thus, although the small amount of light is reduced after it passes through the band pass filter 104, the very high signal-to-noise ratio can be obtained advantageously.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A touch type display device comprising:
   a flat panel display module;
   a plurality of infrared light emitting units disposed on a portion or on the entirety of the edge of the flat panel display module;
   an infrared camera disposed on at least two corners of the flat panel display module, the infrared camera including a sensor for sensing infrared light from the infrared light emitting unit and a lens; and
   a band pass filter allowing light of a certain wavelength band in light emitted from the infrared light emitting units to pass therethrough,
   wherein the infrared light emitting units are infrared light emitting diodes emitting infrared light of which the center of a wavelength distribution is 870 nm, and the band pass filter allows a wavelength band ranging from 860 nm to 880 nm to pass therethrough, and
   wherein the band pass filter is disposed at the front face of the lens so that the infrared light filtered by the band pass filter is reached to the sensor through the lens.

2. The device of claim 1, wherein the wavelength band of the light that passing through the band pass filter is the same as a wavelength band taking up a distribution of more than 80% based on a wavelength corresponding to the center of the distribution in the infrared light emitted from the infrared light emitting units and having a certain wavelength distribution.

3. The device of claim 1, wherein the lens has a viewing angle of at least 90°.

4. A touch type display device comprising:
   a flat panel display module;
   a plurality of infrared light emitting units disposed on a portion or on the entirety of the edge of the flat panel display module;
   an infrared camera disposed on at least two corners of the flat panel display module, the infrared camera including a sensor for sensing infrared light from the infrared light emitting unit and a lens; and
   a band pass filter allowing light of a certain wavelength band in light emitted from the infrared light emitting units to pass therethrough,
   wherein the infrared light emitting units are infrared light emitting diodes emitting infrared light of which the center of a wavelength distribution is 940 nm, and the band pass filter allows a wavelength band ranging from 930 nm to 950 nm to pass therethrough, and
   wherein the band pass filter is disposed at the front face of the lens so that the infrared light filtered by the band pass filter is reached to the sensor through the lens.

5. The device of claim 4, wherein the wavelength band of the light that passing through the band pass filter is the same as a wavelength band taking up a distribution of more than 80% based on a wavelength corresponding to the center of the distribution in the infrared light emitted from the infrared light emitting units and having a certain wavelength distribution.

6. The device of claim 4, wherein the lens has a viewing angle of at least 90°.

* * * * *